(No Model.) 3 Sheets—Sheet 1.

M. C. McMILLAN.
CHECK ROW ATTACHMENT.

No. 495,429. Patented Apr. 11, 1893.

WITNESSES
INVENTOR (No Model.) 3 Sheets—Sheet 2.

M. C. McMILLAN.
CHECK ROW ATTACHMENT.

No. 495,429. Patented Apr. 11, 1893.

WITNESSES
H. M. Plaisted
F. B. Ernest

INVENTOR
Moses C. McMillan
By H. A. Toulmin
his Attorney (No Model.)
3 Sheets—Sheet 3.
M. C. McMILLAN.
CHECK ROW ATTACHMENT.
No. 495,429.
Patented Apr. 11, 1893.
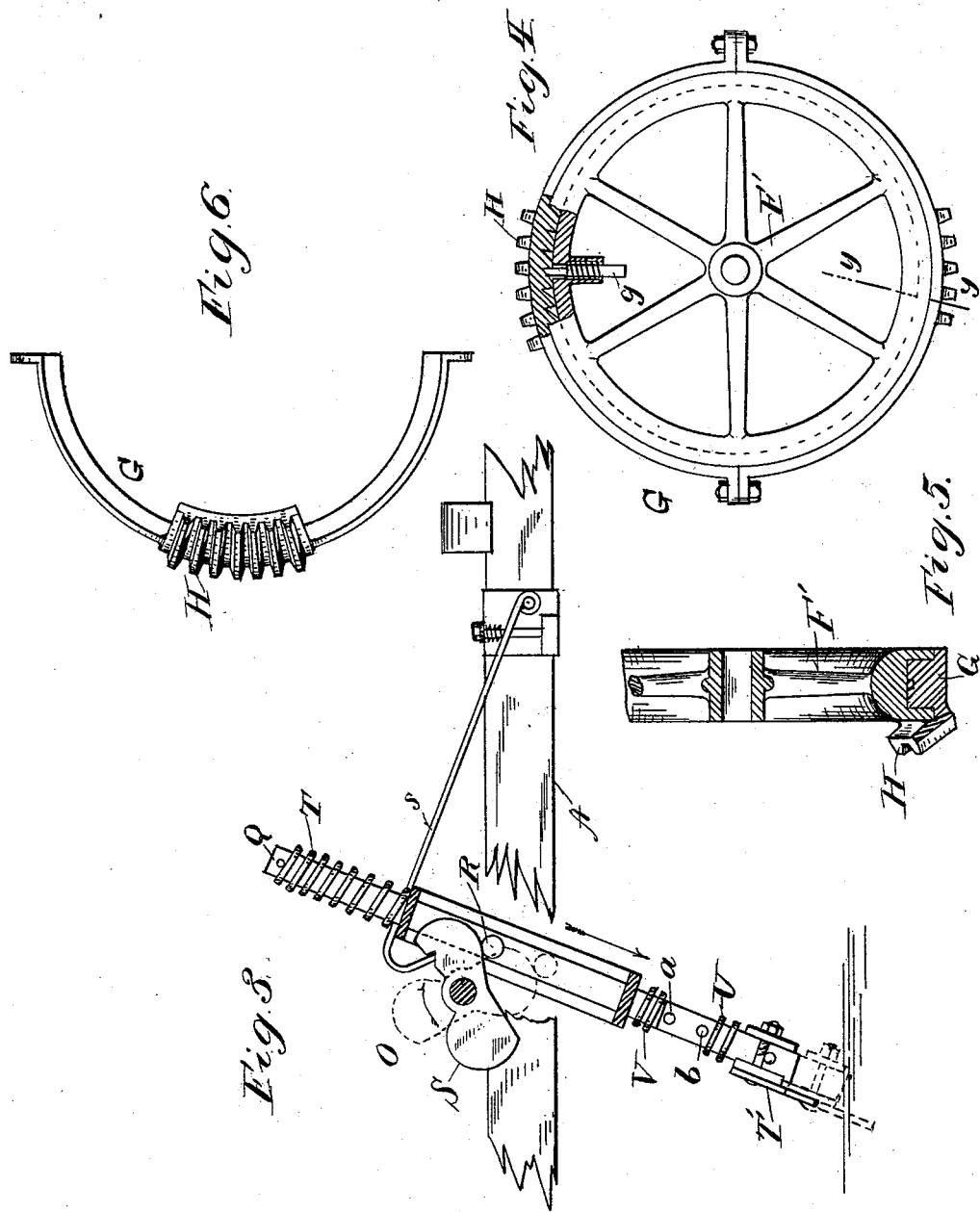
WITNESSES
INVENTOR

UNITED STATES PATENT OFFICE.

MOSES C. McMILLAN, OF GURNEYVILLE, OHIO.

CHECK-ROW ATTACHMENT.

SPECIFICATION forming part of Letters Patent No. 495,429, dated April 11, 1893.

Application filed April 18, 1892. Serial No. 429,540. (No model.)

*To all whom it may concern:*

Be it known that I, MOSES C. MCMILLAN, a citizen of the United States, residing at Gurneyville, in the county of Clinton and State of Ohio, have invented certain new and useful Improvements in Check-Row Attachments, of which the following is a specification, reference being had therein to the accompanying drawings.

My invention relates to certain new and useful improvements in marker attachments for corn planters and other seed planting machines.

My improvements have reference to sliding shovels adapted to be regularly operated to mark the ground corresponding with the hills planted; to cams to operate said shovels and springs to effect their return; to an adjustable gear mechanism to operate said cams; to a particular form of adjustable gear segment, adapted to take up more or less of the connection between the shovels and the driving wheel, to operate the shovels in accordance with the deposit of the seed; to a particular form of shovel and adjunctive devices; to means for throwing the shovel and feed mechanism out of operation and to other points of detail hereinafter described and claimed.

Figure 1:
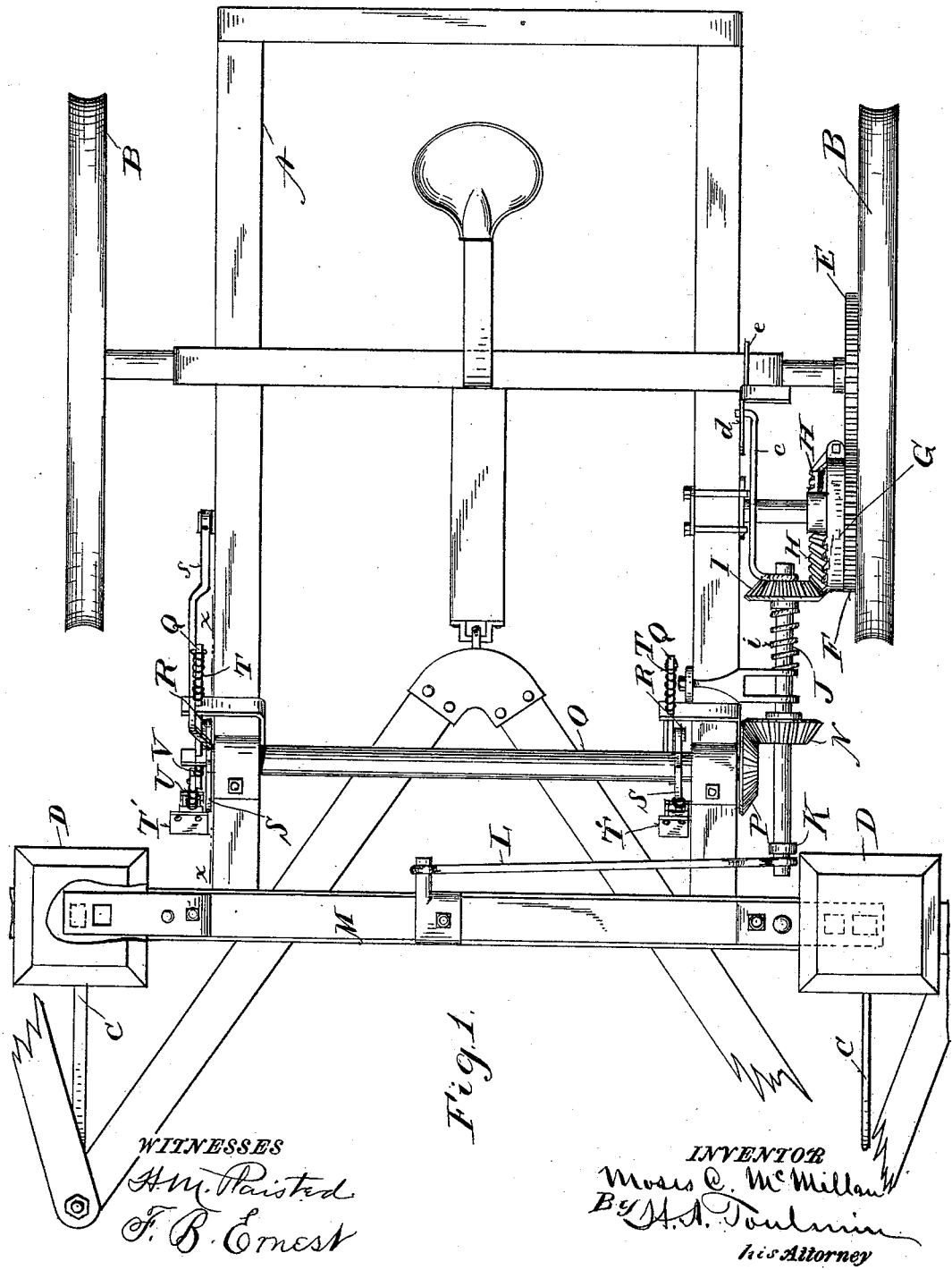
Figure 2:
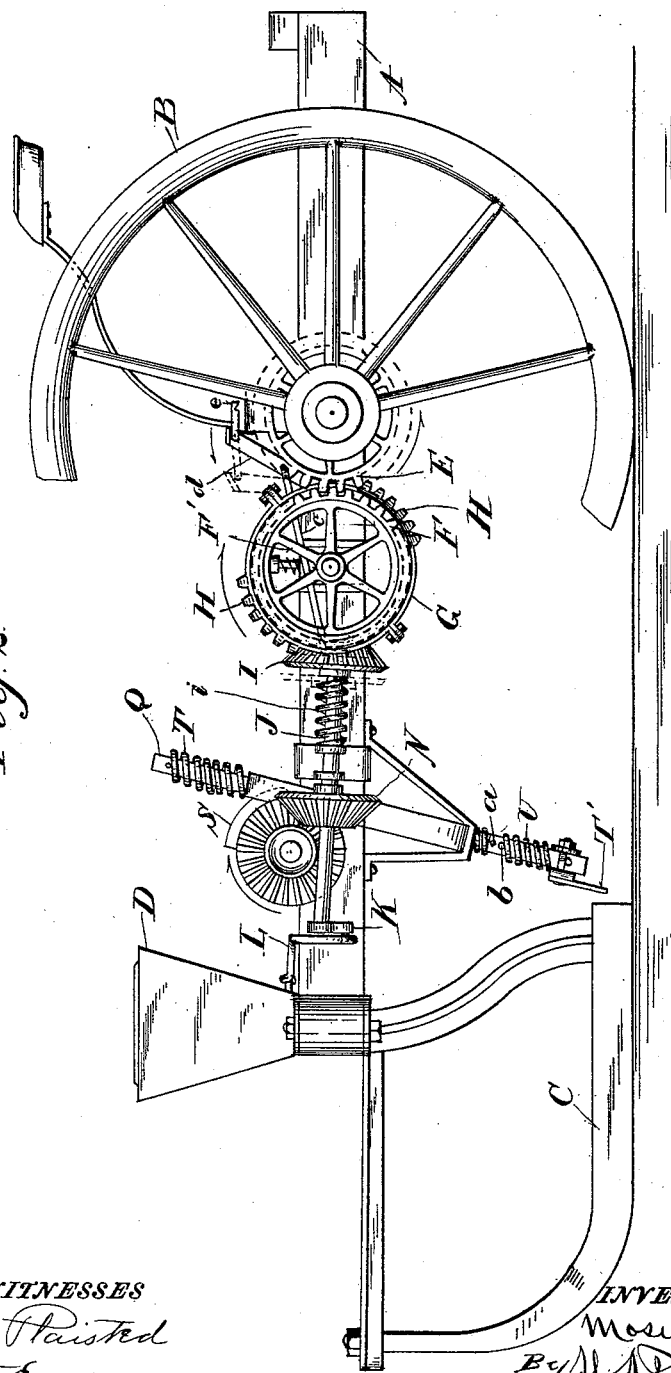

In the accompanying drawings on which like reference letters indicate corresponding parts: Figure 1, represents a plan view of my attachment applied to a corn planter; Fig. 2, a side view of the same with portions broken away; Fig. 3, a side view of one of the shovels, said bar of the frame being broken away to show the guides, and the cam and a pinion on the shovel bar operating therewith; Fig. 4, a detail of the sliding ring segment gear showing its ratchet connection with the wheel ring on which it is mounted; Fig. 5, a section on the line y, y of Fig. 4, showing a portion of the gear segment; and Fig. 6, a side view of half the sliding ring with the gear segment thereon.

The letter A, designates a frame of rectangular, or other shape, mounted on carrying wheels B, B. Hoes or shoes C, C, drill the ground for the deposit of seed from the feed boxes D, in front of the carrying wheels B, which also serve in this machine to cover the seed. On the axle, or connected to one of the carrying wheels to rotate therewith, is a driving gear E, meshing with a speed gear F, secured to a wheel F' having a sliding ring G, constituting the outer rim of the latter wheel and provided with toothed portions or gear segments H, oppositely located on said ring and adapted to mesh with a bevel gear I, slidingly mounted on a shaft J, having a crank K, connecting by a rod L, or otherwise, with a feed slide M, or other device for delivering the feed from the boxes D. The gear segments H, act to open the feed boxes and close them, during which period the seed is deposited. The untoothed portion of the ring G, allows the gears to rotate without rotating the crank-shaft J.

In order to mark opposite the seed deposited by each feeder, I mount a bevel N, on the shaft J, and provide a transverse shaft O, with a matching bevel P, to rotate it when the shaft J, rotates. Adjacent to the transverse shaft O are sliding shovels Q, having projecting pins or lugs R, engaged by cams S, mounted on said shaft O, and provided with springs T, to return said shovels after the cams have forced them down into the ground. These cams S, Fig. 3, are rounded on the side opposing the pin or lug, and are preferably double winged as seen in Fig. 3. The abrupt change of contour allows the spring T, on each shovel to return it quickly from the ground. The blade T' on the bottom of each shovel has a spring U, which allows the blade to spring back when it strikes a stone, the blade being slidingly mounted on the shovel bar. Another spring V, on the shovel bar cushions the return of the shovel under the action of the spring T.

In Fig. 3, the dotted position of the cam and shovel blade shows the shovel while scraping or marking the ground. If the blade meet an obstruction, such as a root or stone, a a wooden pin *a*, will break and allow the shovel blade to turn on the pivot pin *b*, instead of breaking the shovel bar. In turning around at the end of a row, or in turning out to avoid an obstruction such as a stone or a stump, it will be desired to adjust the marker to the rows again. This is done by means of the sliding ring G, before mentioned, which may be rotated on its wheel center F' in the direction of the arrow Fig. 2, and thus cause the tooth segment H, to act more or less quickly on the seeding and marking mechanisms. Thus if the driver observes that the machine is not marking properly he can rotate the sliding ring to make it drop and mark accordingly to the hills already deposited.

Fig. 4, shows a ratchet piece g, spring-actuated, which allows the rotation of the ring H, as just described in one direction, but effects a rigid connection in the other direction with the wheel center F' to operate the bevel gear I.

When it is desired to stop the operation of the feeding and marking mechanism, the bevel gear I, is thrown back against a spring i, by a link and lever c, d, respectively, and held by a catch e. This may be done by the foot of the rider.

The intermediate gear F, between the driving gear E, and the wheel center F', may be dispensed with, if the size of the carrying wheels B, is such as to operate the marking and feeding mechanism at the proper intervals of travel, say three feet between the hills. In fact the wheel center F' may be mounted directly on the axle of the carrying wheels to rotate therewith, if the proportion be such as to give the proper interval.

While the cam S, operating the shovels, has been shown with two wings or blades, it may be otherwise formed to effect the required action of the shovels.

The feed mechanism has been shown reciprocating; the invention is not limited to this construction, as it is evident that the marking mechanism may be applied to other feed mechanism than that shown.

Referring to Fig. 3, it will be seen that the catch s, acts on one of the cams to prevent the backward rotation thereof. When the cam is in the position shown in full line s, Fig. 3, the pin or lug R, on the shovel bar is engaged by the spring T, with the forward face of the cam, whereby the cam is temporarily locked against accidental rotation in either direction. The cam will be rotated to the dotted position and depress the shovel, when the toothed segment below in Fig. 2, is brought around in the direction of the arrow to engage with the bevel I and rotate the crank shaft J.

Having thus fully described my invention, what I claim as new, and desire to secure by Letters Patent, is—

1. In a marking attachment for planters, the combination with a wheel center acting as a driver, of a ring slidingly mounted on said wheel center to rotate readily, and provided with bevel gear segments on its periphery, one of said members being provided with ratchet teeth, and a spring catch carried by the other member to engage with said teeth, a matching bevel pinion mounted adjacent to said ring and adapted to be intermittently rotated by said segments and adjunctive devices acted on by said pinion.

2. In a marking attachment for a planter, the combination with a frame, of shovels slidingly mounted thereon, rotatable cams to depress said shovels, springs acting to return them, a shaft for said cams, a driving wheel rotated by the motion of the machine on the ground, a sliding ring having a ratchet connection with said driving wheel and provided with gear segments, an intermediate gearing between said cam shaft and said ring segments, whereby the operation of the marker may be adjusted to accord with the previously planted hills.

3. In a marking attachment for planters, the combination with a ring having ratchet teeth, and provided with a series of gear teeth at its periphery, constituting gear segments, of a wheel center and a sliding ratchet piece or bolt mounted in guides in said wheel center, to engage with said ratchet teeth, for the purpose described.

4. In a marking attachment for planters, the combination with the frame, a feed mechanism and spring-returned shovels slidingly mounted on the frame, cams engaging with said shovels to depress the same, a cam shaft therefor, a crank shaft operatively connected to said feed mechanism, a wheel operated by the travel of the machine, a sliding toothed ring mounted on said wheel and a ratchet connection to allow of adjusting said ring, and gearing between said crank shaft and toothed ring, and cam shaft, respectively, whereby the feeding and marking mechanisms are operated and regulated.

5. In a marking attachment for planters, the combination with a frame and a feed mechanism mounted thereon, of reciprocating shovel bars having pins or projections, blades slidingly mounted on the lower end of said bars and provided with springs substantially as described, a double-winged cam acting on each of said projecting pins of the shovel bars to depress the same, springs on said bars to effect their return, a driving shaft and operative connection between said shaft and said cams, and said feed mechanism, respectively, and means to operate said driving shaft to effect a corresponding operation of both feeding and marking mechanism.

6. In a marking attachment for planters, the herein described rotatable sliding ring, consisting of an annulus formed in two parts adapted to be bolted together and having a series of beveled teeth on opposite portions of its peripheral side face, a grooved center wheel to carry said loose ring and ratchet, and means acting directly upon and between said loose ring and its inner wheel center, to connect the members together when rotated in one direction only.

7. In a marking attachment for corn planters, the combination with marking shovels having projecting pieces, of cams adapted to engage with said pieces and depress said shovels, springs acting to return the latter, a shaft for said cams and means to rotate said shaft in one direction, and a catch acting on one of said cams to lock them against a reverse rotation.

In testimony whereof I affix my signature in presence of two witnesses.

MOSES C. McMILLAN.

Witnesses:
JOSEPH NOON,
A. N. WILLIAMS.